US008514065B2

(12) United States Patent
Huebl

(10) Patent No.: US 8,514,065 B2
(45) **Date of Patent: *Aug. 20, 2013**

(54) METHOD AND DEVICE FOR WAKING USERS OF A BUS SYSTEM, AND CORRESPONDING USERS

(75) Inventor: Jochen Huebl, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/985,448

(22) Filed: Jan. 6, 2011

(65) Prior Publication Data

US 2011/0107130 A1 May 5, 2011

Related U.S. Application Data

(63) Continuation of application No. 10/748,993, filed on Dec. 29, 2003, now Pat. No. 7,890,229.

(30) Foreign Application Priority Data

Dec. 30, 2002 (DE) .................................. 102 61 387
Dec. 15, 2003 (DE) .................................. 103 58 584

(51) Int. Cl.
*G08B 1/08* (2006.01)

(52) U.S. Cl.
USPC .......................................................... 340/533

(58) Field of Classification Search
USPC ........... 713/324; 701/36; 340/12.31, 426.16, 340/426.25, 533
See application file for complete search history.

(56) References Cited

U.S. PATENT DOCUMENTS 5,581,556 A 12/1996 Ohie
5,914,796 A 6/1999 Selin
6,029,061 A 2/2000 Kohlschmidt
6,115,831 A * 9/2000 Hanf et al. ...................... 714/43
6,282,668 B1 8/2001 Neudecker
6,339,806 B1 1/2002 Foster et al.
6,484,082 B1 11/2002 Millsap et al.

FOREIGN PATENT DOCUMENTS

DE 102 25 578 12/2003
WO WO 01/20434 3/2001
WO WO 01/42054 6/2001

* cited by examiner

*Primary Examiner* — Vernal Brown
(74) *Attorney, Agent, or Firm* — Kenyon & Kenyon LLP

(57) ABSTRACT

A device for waking up users of a bus system includes an evaluator having at least one clock-pulse generator and configured to selectively evaluate the wake-up information used to activate the users. The wake-up information to be evaluated has the structure of a standard CAN message. The activating procedure is initiated only in response to the presence of wake-up information that is specified for the respective user.

25 Claims, 4 Drawing Sheets

101
107
104
102
108
105
100
106
109
103

METHOD AND DEVICE FOR WAKING USERS OF A BUS SYSTEM, AND CORRESPONDING USERS

RELATED APPLICATION INFORMATION

The present application is a continuation of U.S. patent application Ser. No. 10/748,993, filed Dec. 29, 2003, now U.S. Pat. No. 7,890,229 which claims the benefit of and priority of German Patent Application No. 102 61 387.7, which was filed in Germany on Dec. 30, 2002, and German Patent Application No. 103 58 584.2, which was filed in Germany on Dec. 15, 2003, the entire contents of all of which are expressly incorporated herein by reference.

BACKGROUND INFORMATION

Control devices in a motor vehicle are increasingly supplied with voltage on a continuous basis (also referred to as clamp 30 capability) in order to be able to execute certain monitoring and control functions even when the ignition is shut off. This may involve an access and entry authorization or a diagnosis case, for example. To reduce energy consumption, the control devices are brought into a so-called sleep mode. This is done either by switching off the voltage regulator or by entering a corresponding operating mode of the micro-controller.

When required, the control device must be awakened. This is accomplished either via a line to a wake-up input of the user's micro-controller provided for this purpose, or to a wake-up input of the voltage regulator. In the systems used today, which are generally networked, this may also occur by activity on the bus lines.

This has the disadvantage that either a separate wake-up line must be provided to all required control devices, or, in the case of a wake-up via the bus, all control devices, even those not required, are reactivated by intended or unintended bus activity, either by communication on the bus or by interference on the bus.

It is an object of the present invention to selectively wake up only those control devices that are needed to carry out the required functions, using the bus utilized in motor vehicles, in particular a CAN bus.

SUMMARY OF THE INVENTION

The present invention is based on a method and a device for waking up users of a bus system, a counter being provided which counts at least one predefined signal feature of the signals transmitted on the bus system and initiates the further wake-up procedure once a preselectable number has been reached.

In an advantageous manner, an edge or an edge change of the signal is provided as preselected signal feature.

It is also possible for a signal level or a certain combination of several signal levels to be conveniently provided as preselected signal feature.

Especially advantageous is that a time duration is determined in response to the first occurrence of the signal feature and that, from the time duration thus determined following the first occurrence relative to the time duration, binary information results that allows a selective wake-up of users of the bus system.

It is also possible to gather the user to be awakened from the obtained information; this may also be accomplished by the renewed transmission of another wake-up notification or message.

In an advantageous manner, the control devices connected to the bus may thus shut off their micro-controllers altogether or bring them into a sleep mode with a likewise switched-off clock generator; only the transceiver connected to the bus, in particular a CAN transceiver having minimal power consumption, must be supplied with stand-by power. By using the time duration, which is freely selectable, the decoding may be implemented independently of the utilized transmission rate of the bus system. In addition, the evaluation makes it possible to detect errors in the block structure with respect to the communication blocks in the bus system.

DETAILED DESCRIPTION

Figure 1:
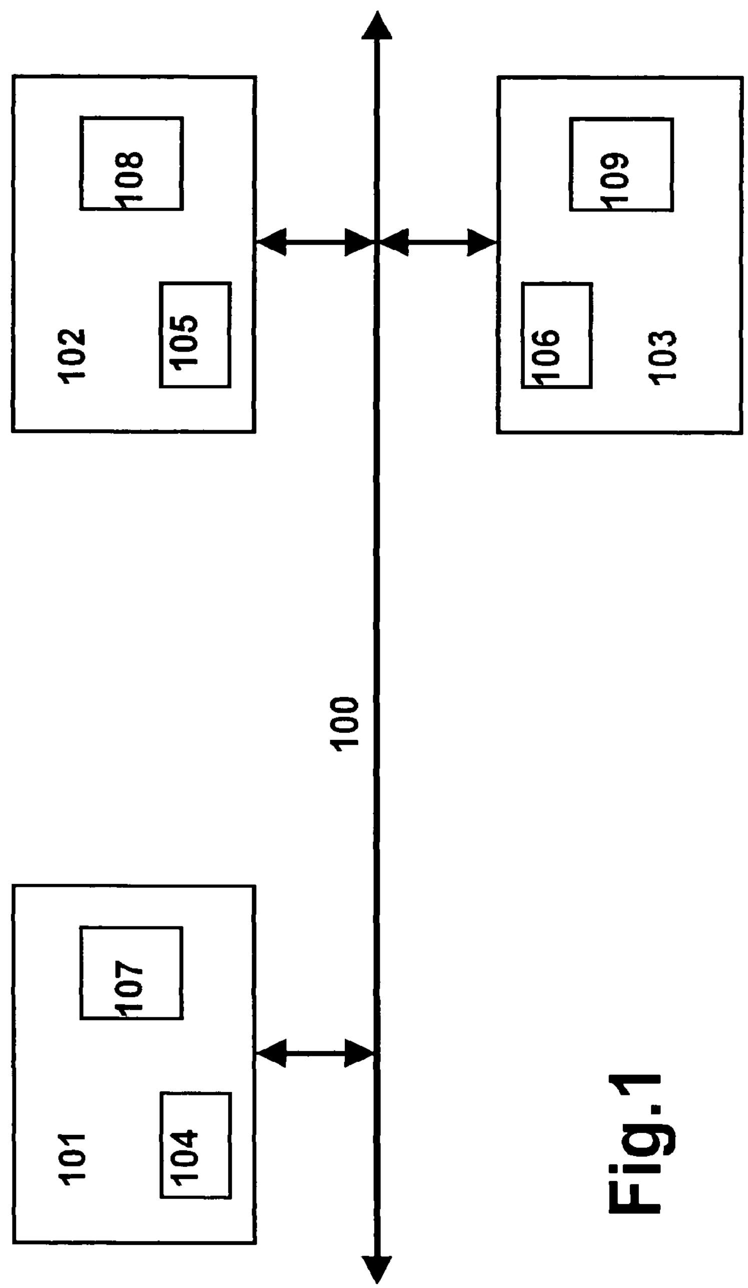
FIG. 1 shows a bus system having a plurality of users, at least two users.

FIG. 1 shows a bus system 100 with bus users 101, 102 and 103. These each include an implementing unit 107, 108 and 109, respectively, as well as a time-detection component or counter component or counter 104, 105 or 106. As already mentioned, in this exemplary embodiment only those control device required to carry out the required functions are to be selectively awakened, via the CAN bus often used in motor vehicles. In doing so, a grouping of devices that respond to the same wake-up information is possible too.

One possibility would be to use certain parts of a message/CAN frame (identifiers, for example) for the selection. However, this requires that the wake-up device is permanently connected to a clock generator, which, however, contributes considerably to the energy consumption. This type of wake-up requires that the transmission rate of the bus be known and that the clock generator have only very slight fluctuations in response to external influences, such as supply voltage or temperature etc. Consequently, the precise objective is to use or develop a selection method that operates in multiple steps and does not require a clock generator in the first step.

The control devices, or users 101, 102 and 103, connected to the bus may switch off their micro-controllers completely or bring them into a sleep mode with a switched-off clock generator. Only the CAN transceiver, i.e., the user having the lowest power consumption, user 101 in this case, for example, is supplied with stand-by power.

The selection mechanism is activated only when a characteristic signal is detected on the bus, and it is possible to activate the micro-controllers, for example, and/or additional voltage regulators of users 102 and 103, respectively.

The present invention may be designed equally as a one-step or as a two-step wake-up concept so as to further increase the waking reliability.

If a plurality of devices respond to the same wake-up mechanisms, i.e., to the same characteristic signals, entire device groups are able to be awakened, or the devices be combined into groups or special devices be awakened for special applications as well.

Due to the configuration of the logic, the information may be extracted from the message regardless of the used transmission rate, as will be explained in greater detail below. In the process, the number of changes between high and low or 0 and 1, i.e., the binary information, is largely constant.

It is especially preferred when the wake-up message is a message configured according to the CAN bus ISO standard. This message does not violate this standard and thus does not cause any problems in existing systems. A CAN controller, as it is used in other approaches, will then not be necessary.

It is especially advantageous that, following the initiation of the further wake-up procedure, the message is sent again and it is determined on this basis which users are to be selected for a complete wake-up.

Figure 2:
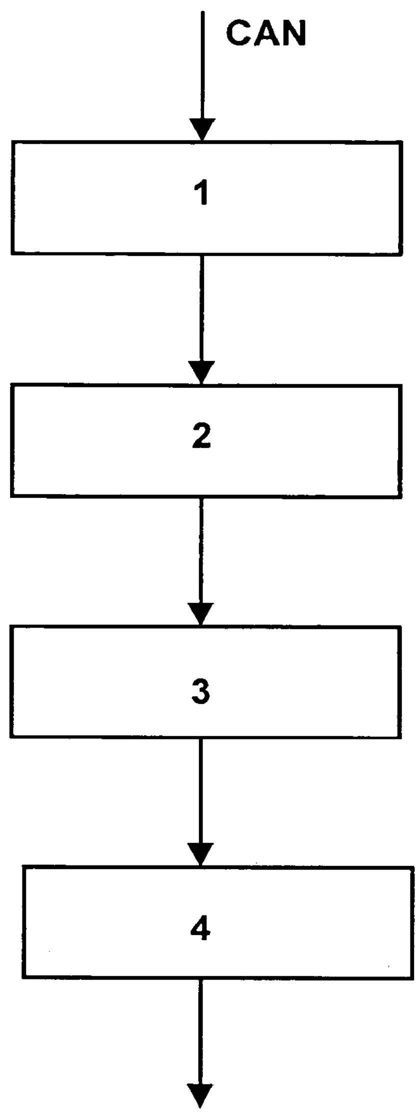
FIG. 2 shows a method sequence according to the present invention, in the form of a flow chart.

FIG. 2 shows the basic flow diagram as an example. The transmitter of the wake-up request sends a message A according to FIG. 3 on the bus in which the receiver or the receiver group to be awakened is encoded by a number, as in a CAN bus in the example shown. In the sleep mode, the bus is recessive. When the first message arrives, which may be detected by the change to dominant occurring in block 1 of FIG. 2, and by which a counter or the time acquisition is activated. Over a certain time period, which is influenced by several factors, the number of edges or signal levels as well, that is, of the message having n pulses, is counted in block 2 of FIG. 2. If this number is within the permissible limits, the second part of the circuit is activated. This results in a first separation of communication or interference on the bus and a wake-up request. If this comparison is positive, i.e, if a wake-up request is involved, the second step of the logic is energized. The transmitter now sends message A according to FIG. 3 for the second time. The wake-up logic, that is, the processing unit, in particular, then reads out from the message the number of the device or the device group that is to be awakened. This takes place in block 3 of FIG. 2. If the read-out number matches a stored number, the device is activated via activation of the voltage regulators or via waking of the micro-controller in block 4 of FIG. 2, and the corresponding user takes part in the bus traffic. The combination of blocks 2 and 3, as described before, is shown in this flow diagram. It is also possible to use only one of the two steps as wake-up criteria.

Figure 3:
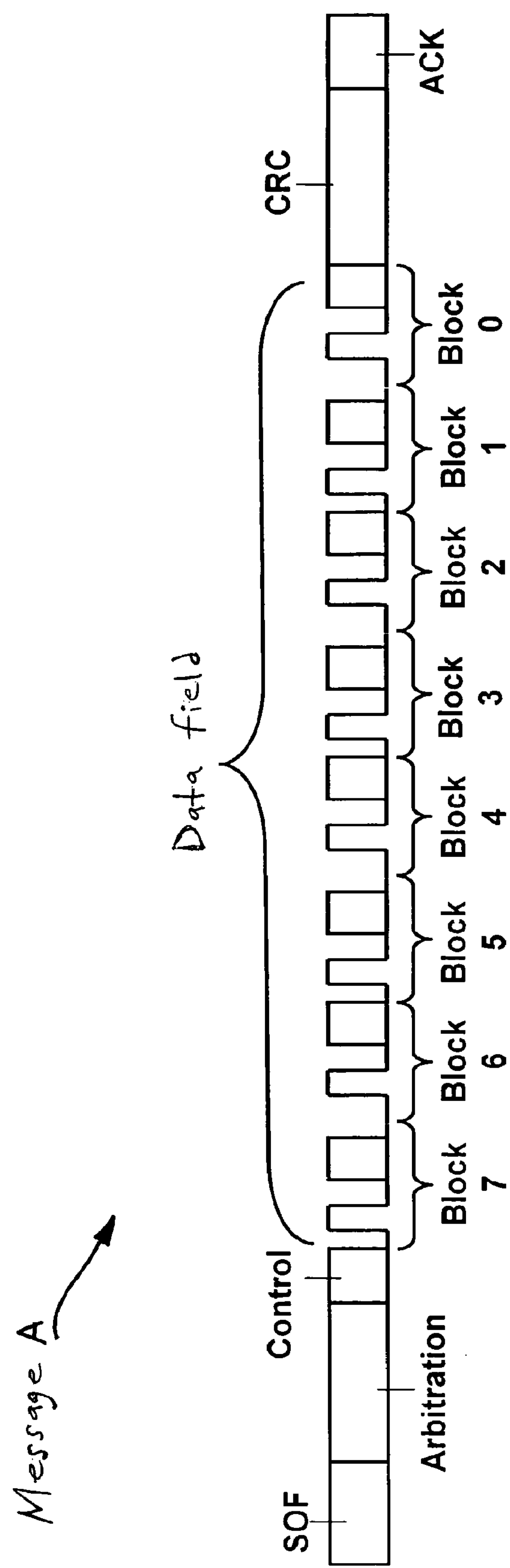
FIG. 3 shows, by way of example, a message having wake-up information encoded in the data field.

According to FIG. 3, message A is used in a preferred form as a message configured as CAN bus ISO standard. Provided are a start of frame, SOF, an arbitration field, which usually includes the identifier, and a control field before the data field. Included after the data field are a check number as cyclic redundancy check, CRC, and a confirmation field regarding the message transmission, an acknowledgment ACK. Message A includes the number of the device or the device group in the data field. The wake-up ID may be used as CAN identifier, that is, rrr rrrd rrrr according to CAN specification 2.0, r denoting recessive and d dominant. In this way, the frame corresponds to the CAN bus specification, and the communication of other devices via the CAN bus is not disturbed.

As shown in FIG. 3, the entire data field in the frame, in particular in the CAN frame, is made up of 64 bits in this case, subdivided into 8 blocks, namely block 0 to block 7. Encoded in each block is at least 1 bit of the device number. If exactly 1 bit of the device number is encoded in each block, the circuit is able, as shown, to obtain 8 bits from a CAN frame for the further processing. Due to the nesting of these 8 bits, errors in the transmission may be detected.

Figure 4:
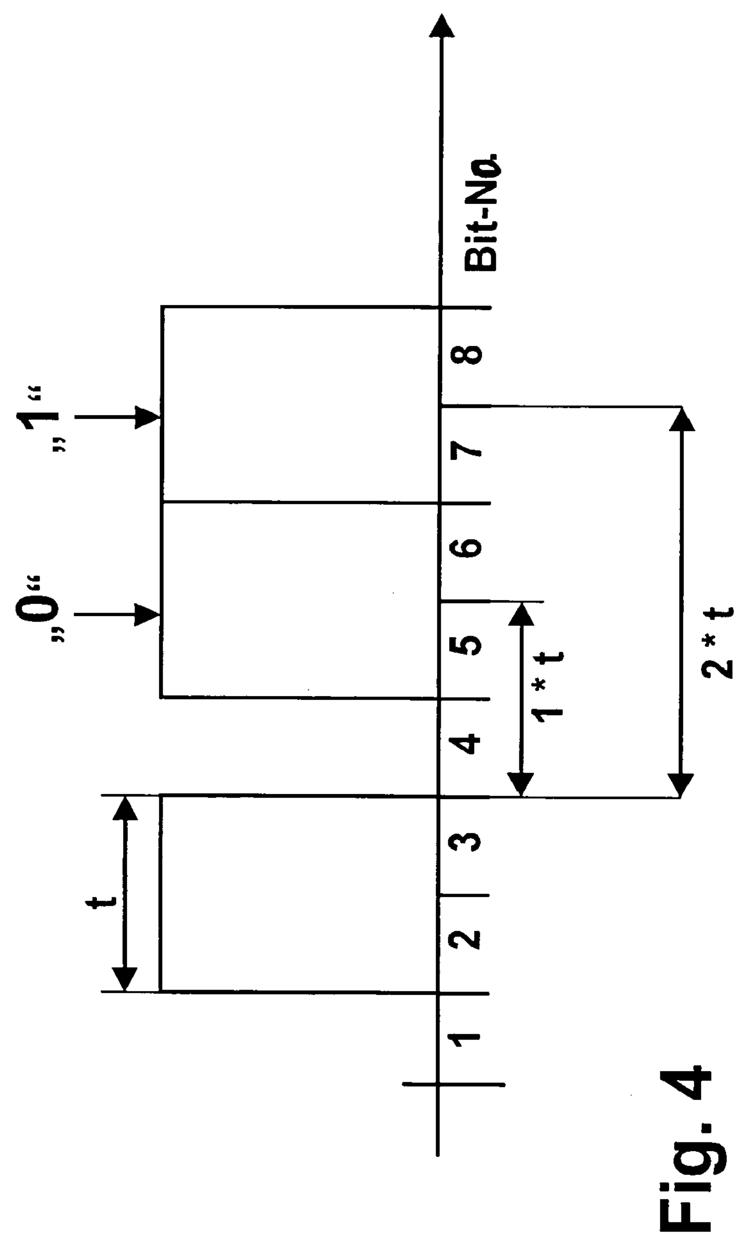
FIG. 4 shows the configuration, according to the present invention, of a block in the data field to determine the signal feature, with encoded information.

The special configuration of the individual blocks 0 through 7 from FIG. 3 is shown in FIG. 4. Due to this special configuration of the 8 blocks, the encoding can occur independently of the chosen transmission rate of the bus. In addition, errors in the block configuration may be detected as well. One block corresponds to 8 bits from the CAN data field.

The configuration of a block is shown in FIG. 4 by way of example. Bits 2 and 3 are on high to measure or determine a time t. After bit 3 ends, the wake-up logic or the processing unit waits out the previously determined time t once and stores the state that then occurs; it then waits out time t once again and then again stores the then occurring, renewed state. Time t and 2*t*, as shown in FIG. 4, may be selected such that a full high or low signal may be detected within the framework of the signal levels. In the same way, a detection of the signal edges, from bit 4 to bit 5 and bit 6 to bit 7, is conceivable by appropriate selection of the respective time segments. Regardless of the used transmission rate, this results in an encoding possibility for an 0-information, here in bit 5 and 6, and an 1-information, here via bit 7 and 8.

That means that, in the encoding by way of example in FIG. 4, bit 1 is always 0, bit 2 and bit 3 are always 1 for calibrating time (measuring-in time, or metering-in time) t, bit 4 in turn is always 0 for separating the calibration time from the actual binary information. Bit 5 and bit 6 are selected such here that they are on high, which then means a logical 0 for the block. Bits 7 and 8 are then chosen thus, which would mean a logical 1 for the block. In other words, if bits 5 and 6 are on 1, the block contains a logical 0, and if bits 7 and 8 are on 1, the block includes a logical 1. That means that the bits are set in such a way here that either the bits 5 and 6 or the bits 7 and 8 are on 1. Therefore, the method indicated here shows a transmission that is independent of the baud rate, in particular by the counting of edges or edge changes or the corresponding signal levels, respectively, according to the individual, preselected signal feature; in one case, as a first wake-up step and, in the other case, when evaluating a retransmitted message, as a multi-step concept. As already mentioned, the preselected signal feature may be the signal level, that is, 0 or 1, as in the example of FIG. 4, or also, as already explained, the evaluation of the signal edges or the change in the signal edge. This results in a simple possibility for the selective wake-up of control devices, without additional line requirements and without always energizing all users of the bus system, even those not required.

What is claimed is:

1. A device for connecting a user station to a CAN bus, the user station being able to be activated by the device in response to receiving wake-up information, comprising:

an evaluator including at least one clock-pulse generator and configured to selectively evaluate the wake-up information detected on the CAN bus;

wherein the wake-up information to be evaluated has the structure of a standard CAN message, and wherein activation of a respective user station is initiated only in response to the presence of wake-up information detected on the CAN bus, wherein the wake-up information is one of specified or specifiable for the respective user station, and wherein the evaluation of the wake-up information includes an evaluation of at least one part of one of the data field or the data length code of one of messages present on the CAN bus or potential wake-up messages preselected from the messages present on the CAN bus.

2. The device as recited in claim 1, wherein the evaluation of the wake-up information includes reading out one of a unit number, a group of units, or a unit-specific identifier from the data field and comparing to a corresponding one of a unit number, a group of units, or a unit-specific identifier stored in the respective user station.

3. The device as recited in claim 1, wherein the preselection of the potential wake-up messages from the messages present on the CAN bus takes place with the aid of at least a part of the identifier of the messages present on the CAN bus.

4. The device as recited in claim 1, wherein the evaluation of the wake-up information includes an evaluation of at least one part of the identifier of one of CAN messages present on the CAN bus or potential wake-up messages preselected from the CAN messages present on the CAN bus.

5. The device as recited in claim 4, wherein the preselection of the potential wake-up messages from the CAN messages present on the CAN bus takes place with the aid of at least one part of one of the data field or the data length code of the CAN messages present on the CAN bus.

6. The method as recited in claim 1, wherein the evaluation of the wake-up information includes reading out one of a unit number, a group of units, or a unit-specific identifier from the data field and comparing to a corresponding one of a unit number, a group of units, or a unit-specific identifier stored in the respective user station.

7. The method as recited in claim 1, wherein the preselection of the potential wake-up messages from the messages present on the CAN bus takes place with the aid of at least a part of the identifier of the messages present on the CAN bus.

8. The device as recited in claim 1, wherein a counter which counts at least one predefined signal feature of at least one signal transmitted on the CAN bus and initiates a further wake-up procedure once a preselectable number has been reached.

9. The device as recited in claim 8, wherein an edge or an edge change of the signal is provided as the preselected signal feature.

10. The device as recited in claim 8, wherein a signal level or a certain combination of several signal levels is provided as the preselected signal feature.

11. The device as recited in claim 8, wherein a time duration is determined in response to the first occurrence of the signal feature and binary information results that allows a selective wake-up of users of the bus system.

12. The device as recited in claim 1, wherein at least one control device connected to the bus may thus shut off their micro-controllers altogether or bring them into a sleep mode with a likewise switched-off clock generator; only a one transceiver connected to the bus must be supplied with stand-by power.

13. The device as recited in claim 12, wherein the one transceiver is a CAN transceiver having minimal power consumption.

14. The device as received in claim 1, wherein a time duration of the at least one clock-pulse generator is independent of the utilized transmission rate of the bus system.

15. A method for selectively activating user stations on a CAN bus in response to receiving wake-up information, the method comprising:

evaluating, using an evaluator including at least one clock-pulse generator, the wake-up information detected on the CAN bus, wherein the wake-up information to be evaluated has the structure of a standard CAN message; and initiating activation of a respective user station only in response to the presence of wake-up information detected on the CAN bus, wherein the wake-up information is one of specified or specifiable for the respective user station; and wherein the evaluation of the wake-up information includes an evaluation of at least one part of one of the data field or the data length code of one of messages present on the CAN bus or potential wake-up messages preselected from the messages present on the CAN bus.

16. The method as recited in claim 15, wherein the evaluation of the wake-up information includes an evaluation of at least one part of the identifier of one of CAN messages present on the CAN bus or potential wake-up messages preselected from the CAN messages present on the CAN bus.

17. The method as recited in claim 16, wherein the preselection of the potential wake-up messages from the CAN messages present on the CAN bus takes place with the aid of at least one part of one of the data field or the data length code of the CAN messages present on the CAN bus.

18. The method as recited in claim 15, wherein a counter which counts at least one predefined signal feature of at least one signal transmitted on the CAN bus and initiates a further wake-up procedure once a preselectable number has been reached.

19. The method as recited in claim 18, wherein an edge or an edge change of the signal is provided as the preselected signal feature.

20. The method as recited in claim 18, wherein a signal level or a certain combination of several signal levels is provided as the preselected signal feature.

21. The method as recited in claim 18, wherein a time duration is determined in response to the first occurrence of the signal feature and binary information results that allows a selective wake-up of users of the bus system.

22. The method as recited in claim 15, wherein at least one control device connected to the bus may thus shut off their micro-controllers altogether or bring them into a sleep mode with a likewise switched-off clock generator; only a one transceiver connected to the bus must be supplied with stand-by power.

23. The method as received in claim 15, wherein a time duration of the at least one clock-pulse generator is independent of the utilized transmission rate of the bus system.

24. The method as recited in claim 23, wherein the one transceiver is a CAN transceiver having minimal power consumption.

25. A user station connected to a CAN bus and configured to be activated by wake-up information transmitted on the CAN bus, comprising:

an evaluator including at least one clock-pulse generator and configured to selectively evaluate the wake-up information detected on the CAN bus;

wherein the wake-up information to be evaluated has the structure of a standard CAN message, and wherein activation of a respective user station is initiated only in response to the presence of wake-up information detected on the CAN bus, wherein the wake-up information is one of specified or specifiable for the respective user station, and wherein the evaluation of the wake-up information includes an evaluation of at least one part of one of the data field or the data length code of one of messages present on the CAN bus or potential wake-up messages preselected from the messages present on the CAN bus.

* * * * *